United States Patent Office 3,347,631
Patented Oct. 17, 1967

3,347,631
BISMUTH DISULFIDE AND A METHOD
FOR ITS PREPARATION
Meyer S. Silverman, Norristown, Pa., assignor to Pennsalt Chemical Corporation, Philadelphia, Pa., a corporation of Pennsylvania
No Drawing. Filed Dec. 20, 1963, Ser. No. 332,266
6 Claims. (Cl. 23—206)

ABSTRACT OF THE DISCLOSURE

A new bismuth sulfide compound is provided wherein the atomic ratio of bismuth to sulfur is about 1 to 2. A method of preparation of the new bismuth disulfide is the simultaneous application of elevated temperatures and high pressure to a mixture of elemental bismuth and elemental sulfur, i.e., a temperature of at least 300° C. and a pressure of at least 15 kilobars.

This invention relates to a new sulfide of bismuth and, in particular, relates to bismuth sulfide having a bismuth to sulfur atomic ratio of not more than about 1.0:2.0.

While $Bi_2S_3$ is known, no previous reports of bismuth sulfide having a Bi:S atomic ratio of less than 2:3 have been found. Chemical analyses of repeated preparations have shown the new compound of the present invention to have the empirical formula $BiS_2$. The results of these analyses are further supported by determination of weight losses on oxidation of two samples in pure oxygen at elevated temperatures. Details of analyses are given in Examples 2 and 3.

The differences between the new higher sulfide of bismuth and the previously known sulfide are also demonstrated by differences in the electrical properties of the compounds. The specific conductance of $Bi_2S_3$ varies in the range of from $3.4 \times 10^{-4}$ to about $1 \times 10^{-3}$ (ohm centimeter)$^{-1}$, compared to the greatly higher measured value of $2 \times 10^{-8}$ to $2.5 \times 10^{-7}$ (ohm centimeter)$^{-1}$ for the new compound of the present invention. Differences in electrical conductivities are illustrated in Example 11.

While the new compound is, for all practical purposes, stable at room temperature, it is converted to the conventional $Bi_2S_3$ when heated to temperatures of approximately 280° C. or above. This conversion reaction is accompanied by the formation of $SO_2$ if it is performed in air, or by the formation of free sulfur if it is performed in vacuo or under inert atmosphere.

The conversion of the new bismuth sulfide to the conventional, more electrically conductive, form of bismuth sulfide ($Bi_2S_3$) offers a useful method for sensing temperatures in excess of the approximately 280° C. at which this conversion takes place. For example, a sample of the new compound can be placed in an electrical circuit so balanced that its high resistance does not permit current to flow in appreciable quantities. When the sample is raised to a temperature of about 280° C. the accompanying increase in its electrical conductivity will permit current to flow. This current can be used to energize a solenoid or relay or other electrical device which, in turn, causes a signal to be sounded or made visible. Because no moving parts need be involved in such a system, it can be made resistant to high acceleration loads such as are commonly encountered in rockets and in rapidly vibrating equipment.

Oxidation of the new compound at temperatures of from 280° to about 300° C. yields extremely pure $Bi_2S_3$ plus sulfur dioxide. Thus, the compound of the present invention is valuable as an intermediate in the preparation of high purity $Bi_2S_3$ which is useful as an electrical semi-conductor.

The raw materials for the practice of the present invention are preferably elemental bismuth and elemental sulfur. The bismuth used in the preparations described in the examples of this application was Fisher Scientific Company Certified Reagent Grade, more than 99.9% pure. The sulfur was a high purity grade, more than 99.9999% pure, obtained from the American Smelting & Refining Company. Most commercial grades of bismuth and sulfur can be used in manufacturing the new compound, although the purity of the finished product is, of course, reduced.

The preferred process for manufacturing the new compound involves high temperatures and extremely high pressures. In addition, the ratio of elemental bismuth to elemental sulfur is surprisingly important and, for satisfactory yields, must be maintained between about 1:2 and 1:3 and preferably at approximately 4:11.

At pressures below about 15 kilobars, virtually no yield of the new compound is obtained, even at temperatures as high as 1350° C. Similarly, at temperatures below about 350° C., virtually no yield is obtained even at pressures as high as 80 kilobars. Therefore, although the new bismuth sulfide is for all practical purposes stable at room temperatures and at atmospheric pressures, its manufacture requires a combination of high temperatures of at least 300° C. and high pressures of at least 15 kilobars.

The range for obtaining excellent yields of the new bismuth sulfide without excessively severe reaction conditions is from 40 to 60 kilobars and from 800° to 1300° C.

The term "kilobar" as used throughout this application means 986.9 atmospheres or 14,503.8 lbs. per inch$^2$.

Reaction time may be from 1 second to about 24 hours, but best results will be obtained at reaction times of 1 to about 15 minutes. Optimum reaction times will vary somewhat within the above limits depending on the reaction conditions and on the geometry of the reactor.

After reaction of the bismuth with the sulfur, the excess sulfur must be removed from the product. This is readily accomplished by washing with carbon disulfide. A rinse with ethanol removes the residual carbon disulfide and speeds drying.

While the use of bismuth and sulfur in their elemental form is a useful and entirely practical method for producing the new compound, it should be understood that the compound of the present invention is in no way dependent on the process by which it is made.

The apparatus used in the examples which illustrate the practice of the present invention is similar to that developed at the National Bureau of Standards and described in "Compact Multianvil Wedge Type High Pressure Apparatus," E. C. Lloyd, U. O. Hutton and D. P. Johnson in the Journal of Research of the National Bureau of Standards, vol. 63C, No. 1, July–September 1959, pages 59–64. In place of the $\%_{16}''$ tetrahedral sample holders used in the above reference, $\%_8''$ holders with $\frac{1}{2}''$ anvil faces were employed in the examples which follow and, alternatively, $\%_{16}''$ holders were used with $\frac{3}{4}''$ anvil faces. A polyester film ("Mylar" manufactured by Du Pont Company) was used between the anvil assemblies and the polytetrafluoroethylene sheet ("Teflon," manufactured by Du Pont Company). Additionally, a 0.003" wall boron nitride sleeve was used between the sample and the graphite heaters as electrical insulation. Force was applied to the tetrahedral anvil system by a Watson-Stillman 100-ton hydraulic laboratory press. Pressure calibration was done by measuring the electrical resistance change of bismuth samples. Pressure was measured as a function of ram force and the three discontinuities were considered to occur at 25.4, 27.0 and 88 kilobars. In all of the preparations, a thin sleeve of spectroscopic grade graphite was used as the heating element around the sample, and end plugs of the same material isolated the sample from the platinum or silver tabs that carried the current from the anvils to the heating sleeve. Temperature calibrations were done by measuring the electrical power input required to obtain temperatures which were indicated by a Chromel-Alumel thermocouple, the tip of which was in good contact with the center of the graphite heating sleeve. The temperatures reported here are thus the highest to which any part of the sample was subjected, and it should be recognized that the ends of the sample in each case were somewhat cooler. Experience in repeated calibrations indicates that the temperature values are uncertain by approximately ±50° C., but the relative differences among the temperature levels of the experiment are believed to be quite reliable.

In each preparation the sample was first compressed in the high pressure apparatus, then heated, and then held at the desired conditions for a measured period of time. The high pressure was then maintained until the power was turned off and the sample had cooled to nearly ambient temperature. Cooling was very rapid in all cases.

The X-ray diffraction powder pattern obtained from each run of the new bismuth sulfide showed a characteristic set of lines. The X-ray patterns were obtained by use of a conventional General Electric Model XRD-1 Diffractometer using 0.5 mm. diameter glass capillaries as the sample containers. Intensities were conventionally measured with a Photovolt Densicord densitometer. Major lines of the diffraction pattern were as shown in Table I.

TABLE I

X-ray powder pattern of new bismuth sulfide

| dA. | I |
| --- | --- |
| 3.11 | 100 |
| 2.91 | 60 |
| 2.62 | 65 |
| 2.27 | 60 |
| 1.88 | 70 |
| 1.81 | 70 |
| 1.504 | 60 |

TABLE II

X-ray powder pattern of known $Bi_2S_3$[1]

| dA. | I |
| --- | --- |
| 3.56 | 94 |
| 3.53 | 60 |
| 3.118 | 100 |
| 2.811 | 63 |
| 1.953 | 55 |

[1] Source: National Bureau of Standards Circular 539, vol. 4 (1953), pp. 23–24.

There is a good possibility that the compound of this invention contains bismuth in both of its known valence states, e.g. $Bi^{+3}[BiS_4]^{-3}$. Amorphous compounds containing As and Sb in all their possible combinations have been produced by other methods previously. In any case, the new compound is composed entirely of bismuth and sulfur (as proven by the pure elements employed as starting materials in each example) and contains approximately two moles of sulfur to each mole of bismuth (as shown in Example 2 by gravimetric analysis after removal of free sulfur from the product). The new compound is therefore characterized by the approximate empirical formula $Bi_nS_{2n}$.

The following examples illustrates some of the methods for carrying out the invention.

*Example 1.—Preparation of the new bismuth sulfide*

8.36 grams of 99.9+% Bi and 3.53 grams of 99.9999+% S are finely ground in a Spex Industries heavy duty mixer mill and then pelletized with a Dickson 2-ton capacity hand press. The pellet is loaded into a boron nitride sleeve which is in a graphite heater sleeve in a pyrophyllite tetrahedron, all as described previously in more detail. The completed tetrahedron is placed in the tetrahedral anvil apparatus an dthe whole assembly is then inserted between the pressure platens of a Watson-Stillman 100-ton capacity hydraulic press.

Pressure on the sample is increased to about 47 kilobars and temperature is then increased over a 20- to 30-second period to about 1300° C. These temperature and pressure conditions are maintained for about 5 minutes, after which the electrical power is switched off. The apparatus is then allowed to cool by allowing it to stand under pressure for 5 to 10 additional minutes. At the end of that time, the pressure is released. A soft gray needle-like product is recovered, washed with carbon disulfide, then with ethanol, then dried. Product so prepared was examined microscopically, tested chemically and electrically, and then ground and submitted for X-ray analysis. The resulting X-ray diffraction pattern is the characteristic pattern shown in Table I. Results of the chemical and electrical tests are described in succeeding examples.

*Example 2.—Chemical analysis of the new bismuth sulfide*

A run of the new bismuth sulfide is produced according to the method of Example 1 under a pressure of 46 to 47 kilobars at a temperature of 1200° to 1295° C. for a reaction time of approximately 5 minutes. The molar starting material ratio of bismuth to sulfur is 4:11, and the starting materials are as described in Example 1. The product was thoroughly washed with carbon disulfide to remove all free sulfur, then washed with ethanol and dried.

A portion of the product was oxidized and the sulfur content was determined gravimetrically as barium sulfate.

A portion of the product was precipitated as a basic salt, then ignited to the oxide and determined gravimetrically as $Bi_2O_3$.

The results of the analysis were found to be: Bi—74.0 mole percent and S—23.0 mole percent, indicating a molecular formula of $Bi_{0.97}S_{2.0}$.

A second production run made according to the methods of Example 1 at a pressure of 46 to 47 kilobars, a temperature of 1300° to 1320° C. for a time of 10 minutes, was washed with carbon disulfide and ethanol, dried and analyzed as described above. The results of this second analysis were found to be: Bi—73.4 mole percent and S—23.2 mole percent, indicating a structure of $Bi_{0.96}S_{2.0}$.

*Example 3.—Oxidation and subsequent analysis of oxidation products*

Two samples of the new bismuth sulfide whose X-ray diffraction analysis patterns showed the presence of only the new compound are heated to 1000° C. in pure, dry oxygen on a Chevenard Thermobalance in two separate oxidations. The losses found in the two runs are 14.69 wt. percent and 15.00 wt. percent, respectively. These results are in excellent agreement with the 14.69% calculated for the oxidation reaction:

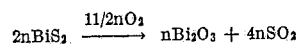

$$2nBiS_2 \xrightarrow{11/2nO_2} nBi_2O_3 + 4nSO_2$$

The residue from the oxidation for bismuth and sulfur as outlined in Example 2 yields the following: Percent Bi calculated for $Bi_2O_3$: 89.7. Percent found: Bi 90.0 and S found: less than 0.1, indicating nearly complete conversion.

*Examples 4–10.—Additional preparations of the ney bismuth sulfide*

The following Examples 4–10 utilize the same procedures outlined more fully in Example 1.

*Example 4*

A 1:15 atomic ratio Bi:S mixture reacted for 5 minutes at 75 kilobars and 1015° C. gives a product having an X-ray diffraction pattern as shown in Table I.

Example 5

A 1:15 atomic ratio Bi:S mixture reacted for about 5 minutes at 71 kilobars and 640° gives a product having an X-ray diffraction pattern as shown in Table I.

Example 6

A 1:15 atomic ratio Bi:S mixture reacted for 3 minutes at 46 kilobars and 790° C. gives a product having an X-ray diffraction pattern as shown in Table I.

Example 7

A 4:11 atomic ratio Bi:S mixture reacted for 5 minutes at 35 kilobars and 745° C. gives a product having an X-ray diffraction pattern as shown in Table I.

Example 8

A 4:11 atomic ratio Bi:S mixture reacted for 5 minutes at 47 kilobars and 1295° C. gives a product having an X-ray diffraction pattern as shown in Table I.

Example 9

A 4:11 atomic ratio Bi:S mixture reacted for 5 minutes at 47 kilobars and 1350° C. gives a product having an X-ray diffraction pattern as shown in Table I.

Example 10

A 1:15 atomic ratio Bi:S mixture reacted for 5 minutes at 46 kilobars and 640° C. gives a product having an X-ray diffraction pattern as shown in Table I.

Example 11.—Determination of electrical properties of the new bismuth sulfide A 4:11 atomic mixture of bismuth and sulfur is reacted at 47 kilobars and 1250° C. for 9 minutes according to the procedure of Example 1. The resulting product consists of silver-gray needles having a strong X-ray diffraction powder pattern characteristic of the new sulfide. The product is recompressed in a hand press to form a right circular cylindrical pellet having a diameter of 0.25 centimeter and a length of 0.25 centimeter. A conventional General Radio Company megohmeter was used to measure the resistance. The specific conductance, i.e. the reciprocal of the specific resistance, was found to be $2.5 \times 10^{-7}$ (ohm centimeter)$^{-1}$.

The new compound from a second run carried out at 1290° to 1310° C. for 5 minutes at 47 kilobars is washed in carbon disulfide to remove excess sulfur, washed in ethanol, vacuum dried, then ground and pressed by hand into a silver chloride rod, the center of which had been bored out to a diameter of 0.100 centimeter. (Silver chloride was used because it is known to be a good pressure transmitting medium.) The resulting pellet is placed in a pyrophyllite tetrahedron drilled to take the silver chloride rod. Silver tabs are inserted to make contact with the sample. The tetrahedron is placed in a high pressure apparatus and the pressure is increased to 10 kilobars. The electrical resistance is read on a sensitive General Electric portable ohmmeter, a Wheatstone bridge type of instrument. The resulting specific conductance is $2.0 \times 10^{-8}$ (ohm centimeter)$^{-1}$.

Comparison of the experimentally determined resistance of the new bismuth sulfide indicates the difference between the new compound and the conventional $Bi_2S_3$. Electrical resistance of $Bi_2S_3$ is reported by T. T. Konorov in Zhur. Tekh. Fiz. 26, 1126–8 (1956); (Chemical Abstracts, 50: 11741a) as being from $3.4 \times 10^{-4}$ to $10 \times 10^{-4}$ (ohm centimeter)$^{-1}$.

Example 12.—Reactions with common reagents

A 1:15 atomic ratio Bi:S mixture, hot-pressed for 6 minutes at about 47 kilobars and 800° C. yielded a mixture of crystalline, gray, crusty, and orange material. When the solid was placed in boiling alcohol, it partially dissolved, but the insoluble residue had the X-ray diffraction pattern characteristic of the new compound as shown in Table I.

The new compound reacted with concentrated nitric acid to give a white precipitate and evolved a brown gas. The following is a possible reaction:

$$BiS_2 + HNO_3 \rightarrow Bi_2O_3 + NO_2 + S + H_2O$$

The new bismuth sulfide reacted with concentrated hydrochloric acid to give hydrogen sulfide and a gray residue.

Example 13.—Stability of the new bismuth sulfide under vacuum and in $O_2$

A 15:1 atomic mixture of sulfur:bismuth is pelletized and subjected to 800° C. at 46 kilobars for 2 minutes, according to the procedures of Example 1. The orange and gray product of the reaction shows only the characteristic X-ray diffraction pattern described previously. When the product is heated gently in a vacuum until all the free sulfur sublimes, a gray residue remains which is shown by its X-ray diffraction pattern to be $Bi_2S_3$.

The first weight loss observed in the thermal gravimetric oxidation cited in Example 3, above, occurred at 283° C. and the percent loss was 6.3% compared to 5.8% calculated for $$2(BiS_2)_n \xrightarrow{nO_2} nBi_2S_3 + nSO_2$$

Further evidence confirming the first decomposition product as $Bi_2S_3$ was afforded by the X-ray diffraction pattern of the residue of the product heated to 290° C. in air.

Example 14.—Determination of density of the new bismuth sulfide

The density of the new bismuth sulfide was measured on a Berman torsion type density balance. The weight of the material was first taken in air and then in toluene and the resulting observations were used to calculate the density.

A sample of the new bismuth sulfide from a run similar to that described in Example 1 is repelletized with the two-ton capacity Dickson hand press, then weighed in the Berman torsion balance first in air and then in toluene. The resulting calculated density is 6.13 grams per cubic centimeter. The calculated density on an identical determination of material similarly prepared is 6.03 grams per cubic centimeter.

Density for $Bi_2S_3$ calculated on the basis of its crystalline structure by the National Bureau of Standards is given in National Bureau of Standards Circular 539, vol. 4 (1953) at pages 23–24 as 6.808 grams per cubic centimeter. The marked difference in densities further illustrates the differences between the known $Bi_2S_3$ and the new compound having the approximate empirical formula $Bi_nS_{2n}$.

Many embodiments of this invention may be made without departing from the spirit and scope thereof, and the invention is to be understood to include all such embodiments and not to be limited by the above descriptions and examples.

What is claimed is:

1. Bismuth sulfide, having bismuth to sulfur atomic ratio of about 1 to 2.

2. A process for producing bismuth sulfide having a bismuth to sulfur atomic ratio of about 1 to 2 which comprises heating to a temperature of at least 300° C. at a pressure of at least 15 kilobars, a reaction mixture consisting essentially of elemental bismuth and elemental sulfur.

3. The process of claim 2 wherein the bismuth to sulfur atomic ratio of the starting materials is from 1:2 to 1:3.

4. The process of claim 2 wherein the bismuth to sulfur atomic ratio is approximately 4:11.

5. The process of claim 2 wherein the temperature is in the range of about 800° C. to 1300° C. and the pressure is in the range of about 40 to 60 kilobars.

6. An electrical switch actuated to conduct current by temperatures above about 280° C. which comprises a piece of bismuth sulfide having a bismuth to sulfur atomic ratio of about 1 to 2 connected into an electrical circuit in series with a source of electromotive power and an electrical load.

References Cited

UNITED STATES PATENTS 2,957,937   10/1960   Jensen et al. _____ 75—134

FOREIGN PATENTS 239,162   10/1911   Germany.

OTHER REFERENCES

Jacobson: Encyclopedia of Chemical Reactions, vol. 1, p. 648 (1946), Reinhold Publishing Corporation, New York.

OSCAR R. VERTZ, *Primary Examiner.*

H. S. MILLER, *Assistant Examiner.*